Patented Mar. 23, 1937

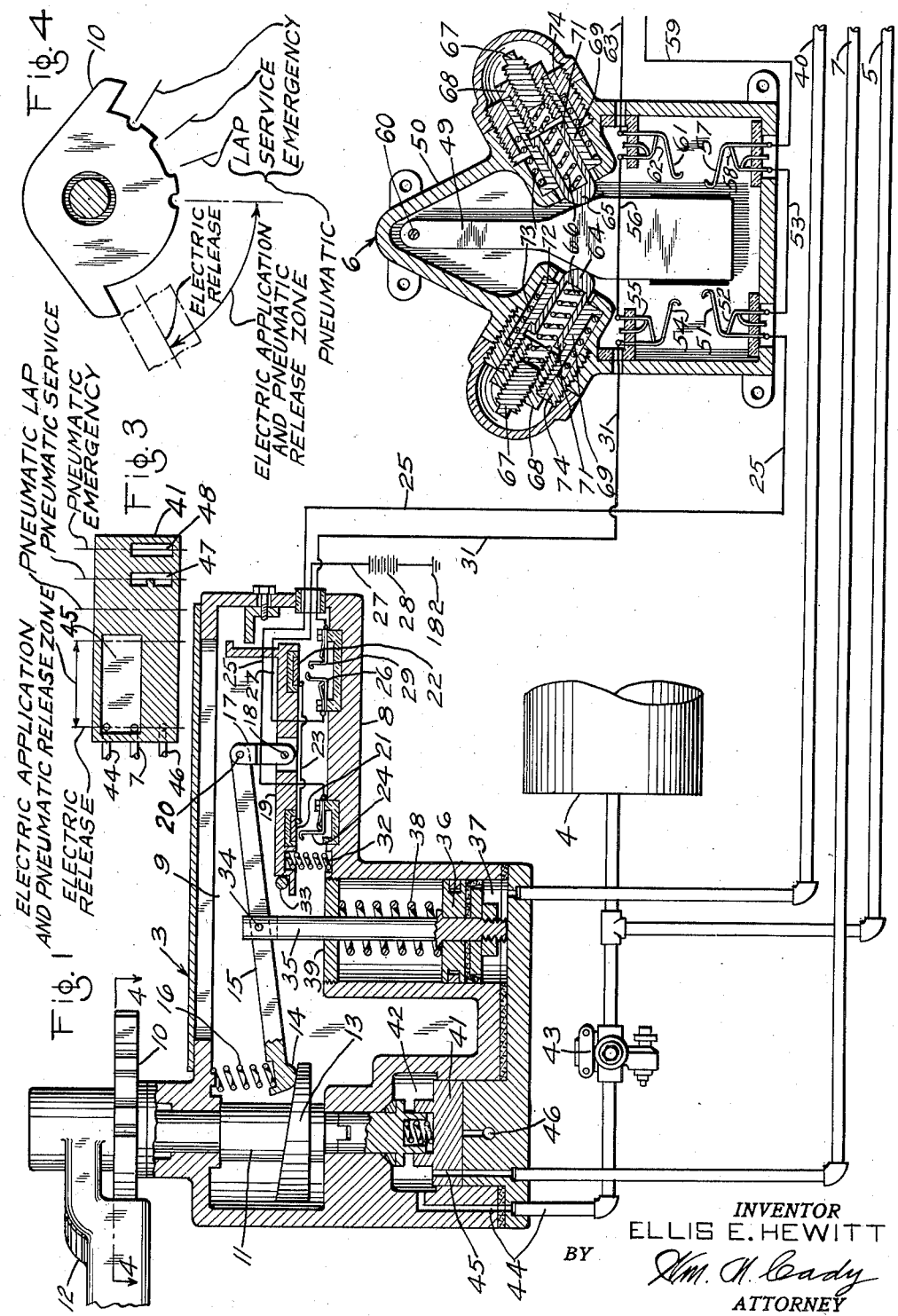

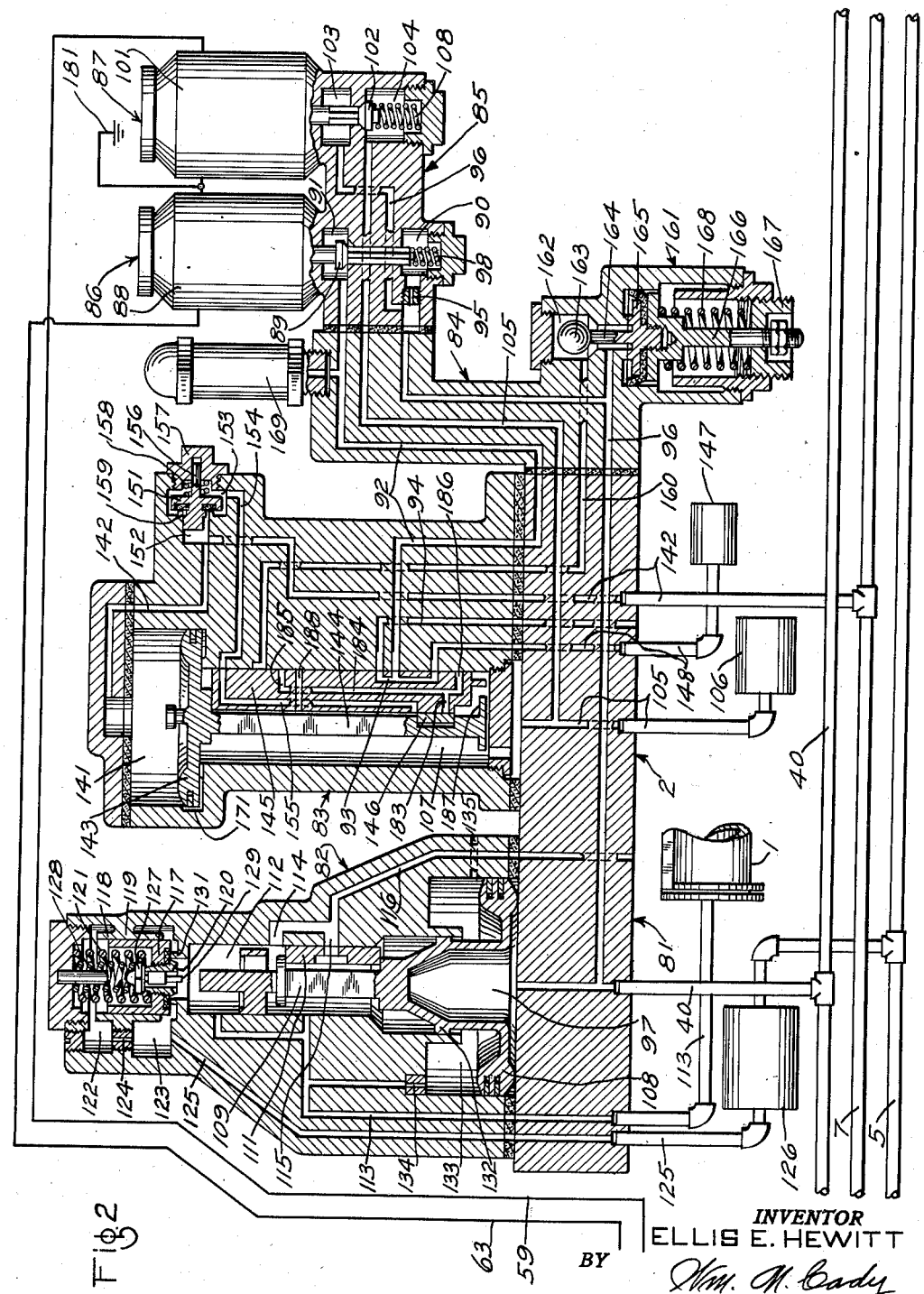

2,074,747

UNITED STATES PATENT OFFICE 2,074,747

FLUID PRESSURE BRAKE EQIUPMENT

Ellis E. Hewitt, Edgewood, Pa., assignor to The Westinghouse Air Brake Company, Wilmerding, Pa., a corporation of Pennsylvania Application August 23, 1934, Serial No. 741,064

21 Claims. (Cl. 303—24)

My invention relates to braking equipment and more particularly to such equipment for use on high speed multiple unit cars and railway trains.

In trains and traction vehicles designed for high speed service, it is essential that a braking equipment be provided that combines a high degree of reliability and safety with simplicity of operation.

In accordance with my invention, an electropneumatic brake equipment is provided including an electric self-lapping brake valve having a self-lapping device controlled by straight air pressure, and that controls magnet valve devices of a control valve assembly for controlling the application and release of the brakes. A retardation controller in the form of an inertia responsive device is provided for also controlling the magnet valve devices to limit the degree of application of the brakes in a manner to prevent the rate of deceleration of the vehicle from exceeding a predetermined value.

A brake equipment of the same general character as outlined above is disclosed and claimed in my copending United States patent application, Serial No. 717,213, filed March 24, 1934, relating to "Braking apparatus" and assigned to the same assignee as this application. In my above referred to copending application, one pair of magnet valve devices is provided on the control valve assembly to be controlled by the self-lapping valve device and another pair of magnet valve devices is provided to be controlled by the retardation controller. In the invention disclosed in this application a single pair of magnet valve devices is provided on each control valve assembly, and are controlled both by the self-lapping brake valve device and by the retardation controller. Other improvements in the apparatus described will appear from the following specification.

It is an object of my invention to provide an equipment of the above indicated character that is particularly adapted for high speed train and vehicle service and in which the application and release of the brakes may be effected by electropneumatic straight air operation, or by automatic operation.

Another object of my invention is the provision of equipment in which the brakes are automatically maintained applied to provide a desired rate of retardation of the vehicle.

Other objects and advantages of my invention will be apparent from the following description when taken in connection with the accompanying drawings; in which Figs. 1 and 2, taken together, comprise a diagrammatic view, mainly in section, showing circuits and apparatus illustrating one preferred embodiment of the invention;

Fig. 3 is a diagrammatic view of the pneumatic brake valve; and

Fig. 4 is a plan view taken partly in section along the line 4—4 in Fig. 1.

Referring to the drawings, and more particularly to Figs. 1 and 2 thereof, each car or train unit may be provided with braking equipment, including a brake cylinder 1 and a control valve assembly 2 that is controlled, either electrically or pneumatically, in accordance with the operation of a brake valve device 3, having an electric self-lapping control portion for controlling the supply of fluid under pressure from a main reservoir 4 to the brake cylinder 1 through a main reservoir pipe 5 and from the brake cylinder 1 to the atmosphere. A retardation controller 6 is provided for limiting the degree of application of the brakes when effected by electrical control of the control valve assembly. Pneumatic control of the control valve assembly 2 effects the application and release of the brakes in accordance with the operation of a valve associated with the brake valve device 3 to produce variations in fluid pressure within the usual brake pipe 7.

The brake valve device 3 may comprise an electric self-lapping portion for controlling normal service applications of the brakes, and a rotary valve portion for controlling auxiliary service and regular emergency applications, and is provided with a casing 8 defining a chamber 9, through one end of which an operating shaft 11 extends that is provided at its upper end with a brake valve handle 12.

A cam 13 for controlling the electric self-lapping portion, is carried by the shaft 11. The upper face of the cam engages the rounded end 14 of a floating operating lever 15 that is urged downwardly against the face of the cam by a spring 16 that is positioned between the upper wall of the brake valve casing structure and the end 14 of the lever 15. The other end of the floating lever 15 is pivotally connected by a pin 20 to a link 17 that is pivotally connected by a pin 18 to a contact carrying lever 19 that supports and carries movable contact members 21 and 22 that are electrically connected together by a conductor 23.

The movable contact member 21 is adapted to engage the fixed contact member 24 that is connected to the train wire 25, and the movable contact member 22 is adapted to engage the fixed contact member 26 that is connected by conductor 27 to one terminal of a source of current such as the battery 28 and to also engage a contact member 29 that is connected to the train wire 31. The contact carrying lever 19 is urged upwardly by a spring 32, the lower end of which is inserted in a recess in the casing structure, and the upper end of which engages the lever 19 and presses it upwardly until the left end thereof engages the under side of a stop 33 and the contact members 21 and 22 are moved out of engagement with the contact members 24 and 26 and 29, respectively, unless and until the contact carrying lever 19 is urged downwardly by operation of the floating lever 15.

The floating lever 15 is pivoted at a point intermediate its end on a pin 34 that is supported in a stem 35 that extends upwardly from a self-lapping piston 36 contained in the piston chamber 37. A spring 38 positioned about the stem 35, having its lower end in engagement with the self-lapping piston 36 and its upper end in engagement with a nut 39, urges the piston 36 downwardly to its illustrated position. The relative forces exerted by the springs 38 and 32 are such that when the left hand end 14 of the lever 15 is in its lower or illustrated position, the spring 32 exerts a sufficient upward force on the contact carrying lever 19 and the link 17 to effect a separation of the movable contact members 21 and 22 from their associated stationary contact members.

The rotary valve 41, contained within a valve chamber 42, is provided with a port 45 adapted to register with a passage leading to the brake pipe 7 when the valve is positioned in the electrical application and pneumatic release zone, so that fluid at the reduced pressure as supplied through the reducing feed valve device 43 from the main reservoir to the rotary valve chamber 42 is supplied through port 45 to the brake pipe 7.

In pneumatic service position, the brake pipe 7 is connected to the atmosphere exhaust port 46 through a cavity 47 in the rotary valve 41, and in pneumatic emergency position, the brake pipe is connected to the exhaust port 46 through a cavity 48.

The straight air pipe 40 communicates with the piston chamber 37 of the self-lapping piston 36 and also with the piston chambers of the relay valve devices associated with each control valve assembly 2 for a purpose to be later explained.

The retardation controller 6 comprises an inertia device, such as a pendulum 49, contained within a casing 50 and pivotally supported thereto by a pivot pin 60. The pendulum 49 is adapted, upon a predetermined movement toward the left, to operatively engage a switch contact member 51 and actuate it out of engagement with the switch contact member 52 to interrupt a circuit connection between a conductor 25 and a conductor 53, and upon a further predetermined movement toward the left, to operatively engage a switch contact member 54 and actuate it out of engagement with a switch contact member 55 to interrupt a circuit connection between a conductor 31 and a conductor 56. In a similar manner the pendulum 49 is adapted, upon a predetermined movement toward the right, to operatively engage a switch contact member 57 that normally engages the switch contact member 58, and separate it therefrom, thus interrupting a circuit connection between the conductor 53 and a train wire conductor 59, and upon a further predetermined movement toward the right, to operatively engage the switch contact member 61 that normally is in engagement with a switch contact member 62, and move the switch member 61 from engagement with the contact member 62, to interrupt a circuit connection between the conductor 56 and a train wire conductor 63.

The pendulum 49 is engaged by spring pressed plungers 64 and 65 that resist its movement from a vertical position. The plunger 64 is provided with a central bore for accommodating a spring 66, one end of which is in engagement with the lower end of the bore, and the other end of which engages an adjusting nut 67, that is screw-threadedly attached within the bore of a stop member 68 that is attached within the outer end of a sleeve 69, the lower end of which surrounds and supports the plunger 64. The plunger 64 is provided at its outer end with an outwardly extending flange 71 that engages a shoulder on the sleeve 69 to limit the movement of the plunger toward the pendulum. The lower end of the sleeve 69 is provided with an outwardly extending flange 72 that engages a portion of the controller casing to limit its inward movement and to accommodate a spring 73 that is positioned about the sleeve. The lower end of the spring engages the outwardly extending flange 72 and the upper end is contained within a portion of a sleeve 74, attached to the controller casing, and engages an inwardly extending shoulder therein.

Upon some predetermined rate of deceleration of the vehicle, assuming movement of the vehicle to be toward the left as viewed in Fig. 1, the inertia of the pendulum 49 will be sufficient to move it, and the plunger 64, toward the left against the bias of the spring 66, until the flange 71 engages the stop 68 and the switch contact member 51 is separated from engagement with the switch contact member 52. The force of the spring 73 is sufficient to maintain the sleeve 69 in its illustrated position, in which the sleeve flange 72 is maintained in engagement with the controller casing. Upon a predetermined greater rate in the deceleration of the vehicle, the inertia of the pendulum 49 will force the plunger 64 further toward the left causing the stop 68 and the sleeve 69 to move against the bias of the spring 73 until the switch contact member 54 has been separated from the switch contact member 55 to interrupt the circuit connection between the conductors 31 and 56. The parts associated with the spring pressed plunger 65 are identical in construction and operation to those associated with the spring pressed plunger 64 and are, therefore, not described in detail.

The control valve assembly 2 comprises a pipe bracket section 81, a relay valve section 82, a triple valve section 83, an inshot valve section 84, and a magnet valve section 85. The magnet valve section 85 comprises a release magnet valve device 86 and an application magnet valve device 87. The release magnet valve device 86 comprises a magnet 88, operatively connected to a release valve 89, for controlling communication between the release valve chamber 91 and a chamber 90. The release valve chamber 91 is normally connected to the atmosphere through passage 92, cavity 93 in the slide valve 145 of the triple valve device, and atmospheric exhaust passage 94. The straight air pipe 40 is connected to the application piston chamber 97 in the relay valve device and through a restricted port 95 to the chamber 90. A spring 98 is provided in the chamber 90 for biasing the release valve 89 to its unseated position.

The application magnet valve device 87 comprises a magnet 101, operatively connected to an application valve 102. The application valve 102 controls communication from the auxiliary reservoir 106, which is connected through passage 105 with chamber 104 to chamber 103, which is connected through passage 96 with the straight air pipe 40, so that when the valve 102 is unseated, fluid under pressure is supplied from the auxiliary reservoir to the straight air pipe. A spring 108 is provided in the application magnet valve chamber for urging the valve 102 to its seat.

The relay valve section 82 comprises a casing having the piston chamber 97 containing an application piston 108 which is adapted, through the medium of a stem 109, to operate a slide valve 111, that is operatively connected to the stem and contained in a valve chamber 112 that is in constantly open communication with the brake cylinder 1, through passage and pipe 113. The slide valve 111 controls communication between the valve chamber 112 and the atmosphere through ports 114 and 115 and the exhaust passage 16.

Also contained within the relay valve section is a supply valve 117 slidably mounted within the cylindrical wall 118 carried by a partition wall 119, and provided with a stem 120 adapted to be engaged by the end of the piston stem 109. The supply valve 117 is subject to the pressure of a spring 121 and to the fluid pressure within a pilot valve chamber 122, that is separated from the supply valve chamber 123 by the partition wall 119, and that is in communication therewith through a restricted port 124. The supply valve chamber 123 is in constantly open communication with the main reservoir pipe 5 through passage and pipe 125, a volume reservoir 126 being interposed in the pipe 125. A pilot valve 127 is provided within the supply valve 117 for controlling communication between the pilot valve chamber 122 and the slide valve chamber 112, and is provided with a pilot valve stem 129 extending through the hollow supply valve stem 120 and beyond the face thereof and which is adapted to be engaged by the end of the piston stem 109 prior to the engagement of the stem 109 with the supply valve stem 120.

The relay valve device is shown in its brake release position, in which position the application piston 108 and the slide valve 111 are in their extreme lower or brake releasing positions. When the slide valve 111 is in this position, the valve chamber 112 and consequently the brake cylinder 1, are in communication with the atmosphere through an exhaust passage 116. With the application piston 108 in its release position, the stem 109 will be out of engagement with the end of the supply valve stem 120 and the pressure of the spring 121 will maintain the supply valve seated against its ring seat 131, thereby maintaining communication closed from the supply valve chamber 123, that is constantly connected to the main reservoir pipe 5, to the slide valve chamber 112. In this position of the application piston, the stem 109 will likewise be out of engagement with the end of the pilot valve stem 129, so that the pressure of the spring 128 will maintain the pilot valve 127 seated, thereby maintaining communication closed from the pilot valve chamber 122 to the slide valve chamber 112.

A baffle piston 132 is provided on the stem 109 and defines a chamber 133, at the upper side of the application piston 108, that is in communication with the slide valve chamber 112 through a restricted port 134 and the passage 113. The baffle piston prevents changes in pressure within the valve chamber 112 from being too rapidly communicated to the upper side of the application piston 108, which, under some conditions, might cause a pumping action of the relay valve. In the release position of the application piston 108, the chamber 133 is also connected to the atmosphere through a passage 135 extending through the casing of the relay valve device.

The triple valve section 83 comprises a casing having a piston chamber 141, that is in constant communication, through passage and pipe 142, with the brake pipe 7, and that contains a piston 143 provided with a stem 144 that operatively engages a slide valve 145 and a graduating valve 146, contained within the slide valve chamber 107 that is in constant communication through passage and pipe 105 with the auxiliary reservoir 106. A brake cylinder volume reservoir 147 is provided and is connected to a pipe and passage 148 that terminates in the seat of the slide valve 145. In the illustrated, or release, position of the triple valve piston 143 and slide valve 145, the cavity 93 in the slide valve registers with the exhaust passage 94 and with the passages 92 and 148 that communicate, respectively, with the release valve chamber 91 and with the brake cylinder volume reservoir 147, thus connecting these two chambers with the atmosphere.

A check valve 151 is also provided within the casing of the triple valve section for controlling communication between a chamber 152, that is in constant communication with the passage 142, and a check valve chamber 153. In the release position of the piston 143, the chamber 153 is in communication with the valve chamber 107, through a passage 154 leading to the slide valve seat, and port 155 in the slide valve 145. The check valve 151 is provided with a stem 156 that is slidably mounted in a bore in a cap nut 157, that is screw-threadedly attached to the casing of the triple valve section. The check valve 151 is subject to the pressure of a spring 158 that urges the valve to its ring seat 159, to prevent flow of fluid under pressure from the slide valve chamber 107 to the brake pipe 7 while permitting the valve chamber 107 and the auxiliary reservoir 106 to be charged from the brake pipe past the valve 151 independently of the charging that occurs through the feed groove 171 past the piston 143.

The pressure limiting valve section 84 includes a pressure limiting valve device 161 having a casing containing a valve chamber 162 that is connected to a passage 160 which leads to the seat of the slide valve 145. A ball valve 163 is provided in the valve chamber 162 and is illustrated as held from its seat by a stem 164 that extends upwardly from a piston 165, that is slidably mounted within the casing, and is provided with a stem 166 that extends downwardly through a bore in the cap nut 167. The piston 165 and the stem 164 are urged upwardly by a spring 168 to unseat the valve 163 and maintain communication between the passages 160 and 96, until the pressure within the valve chamber 162, and on the upper side of the piston 165, increases sufficiently to urge the piston 165 downwardly against the pressure of the spring 168, thus permitting the valve 163 to seat. The pressure limiting valve device is effective to limit the pressure of fluid supplied to the application chamber 97 of the relay valve device through the triple valve device upon operation of the triple valve to its service or emergency position.

The pressure limiting valve section 84 of the control valve assembly also includes a safety valve device 169 to limit pressure in the piston chamber 97 to a predetermined value for which the safety valve is set to operate, when the slide valve 145 is in a position to close communication from the chamber 97 to the atmosphere through exhaust passage 94 and when the valve 89 is unseated. The safety valve device 169 is effective, upon movement of the release valve 89 from its seated position while the slide valve 145 of the triple valve device is in other than its release position, to permit the flow of fluid under pressure from the piston chamber 97 of the relay valve device until the pressure within this chamber has reached some predetermined low value at which the safety valve operates to close communication to the atmosphere.

During the initial charging of the system, the various parts of the apparatus remain in their release, or illustrated, positions, and fluid under pressure flows from the main reservoir 4, through the main reservoir pipe 5 to the volume reservoir 126 associated with each control valve assembly employed on the system, and through pipe and passage 125 to the supply valve chamber 123 and the pilot valve chamber 122. With the rotary valve 41 in pneumatic release position, fluid under pressure supplied by the feed valve device 43 flows through passage 44 to the rotary valve chamber 42 of the brake valve device and through port 45 in the rotary valve to the brake pipe 7. Fluid under pressure supplied to the brake pipe 7, flows through pipe and passage 142, to the piston chamber 141 of each triple valve device. From the piston chamber 141, fluid under pressure flows past the piston 143, through the feed groove 171 to the slide valve chamber 107, and from this chamber through the passage and pipe 105 to charge the auxiliary reservoir 106, and through passage 105 to the application valve chamber 104. The initial charging of the slide valve chamber 107 will also take place partly through the passage 142, past the check valve 151, through passages 154 and 155, so long as the pressure of fluid supplied to chamber 152 is sufficient to overcome the fluid pressure on the opposite side of the valve plus the pressure of the spring 158.

If the operator wishes to apply the brakes, the handle 12 of the brake valve device 3 is moved from its release position to a position within its electric application zone, depending upon the desired degree of application of the brakes. As the brake valve handle 12 is moved the cam 13 is rotated about its axis, thus raising the end 14 of the floating lever 15 which pivots about the pin 34, forcing the link 17 downwardly.

Upon downward movement of the connecting link 17, and the pivot pin 18, the contact carrying arm 19 pivots about the stop 33, the left end of the lever being held in engagement with the stop 33 by the spring 32, until the right hand end has moved downwardly sufficiently to cause engagement of the contact member 22 with the contact members 26 and 29. This closes a circuit from the battery 28, through conductor 27, contact members 26, 22 and 29, conductor 31, switch contact members 54 and 55, conductor 56, switch contact members 61 and 62, conductor 63, the winding of the electromagnet 88 of the release magnet valve device 86 to ground at 181, to the grounded terminal 182 of the battery 28. The closing of the above traced circuit causes the release magnet valve 89 to be moved to close communication between the piston chamber 97 of the relay valve device and the atmosphere.

A further downward movement of the link 17 and pin 18 causes the contact carrying lever 19 to fulcrum about its right end, compressing the spring 32 and causing the contact member 21 to engage the contact member 24, thus closing a circuit from the battery 28 through conductor 27, contact members 26 and 22, conductor 23, contact members 21 and 24, conductor 25, switch contact members 51 and 52 on the retardation controller, conductor 53, switch contact members 57 and 58, conductor 59, the winding of the magnet 101, to ground at 181 and to the grounded terminal 182 of the battery 28. Closing the above traced circuit causes the magnet 101 to be energized, so as to move the application valve 102 downwardly from its seat, opening communication from the valve chamber 104, that is in open communication with the auxiliary reservoir 106 and with the slide valve chamber 107, to the piston chamber 97 through chamber 103 and passage 96. Fluid under pressure also flows from the passage 96 through the straight air pipe 40 to the self-lapping piston chamber 37 of the brake valve device 3, causing the pressure within the chamber 37 to correspond to that supplied to the relay valve piston chamber 97.

As the pressure within the piston chamber 37 increases, the upward force on the self-lapping piston 36 acts against the downward force of the spring 38 to move the piston 36 and its stem 35 upwardly, causing the floating lever 15 to fulcrum about its rounded end 14 to move the connecting link and the pivot pin 18 upwardly. As the pivot pin 18 moves upwardly, the spring 32 causes the contact carrying lever 19 to fulcrum about its right hand end, thus separating contact members 21 and 24 prior to the separation of the contact member 22 from the contact members 26 and 29. Upon separation of the contact member 21 from the contact member 24, the circuit through the winding of the magnet 101 is interrupted and the spring 108 urges the application valve 102 to its seat, cutting off the further flow of fluid to the piston chamber 97 of the relay valve device and to the self-lapping piston chamber 37 of the brake valve device. Fluid under pressure supplied to the relay piston chamber 97, causes the application piston 108 and its stem 109 to be moved upwardly, so that the slide valve 111 is moved upwardly to lap the ports 114 and 115, thus closing communication from the slide valve chamber 112 to the atmospheric exhaust passage 116. The upward movement of the piston also operates to close off communication from the chamber 133 to the atmosphere through exhaust port 135. The degree of pressure within the piston chamber 97 and the self-lapping piston chamber 37 will depend upon the degree of movement of the brake valve handle 12 from its release position. If the brake valve handle is moved further from its release position, the cam 13 will again operate the lever 15 to close the circuit to the application magnet valve device through contact members 21 and 24, and this will cause a further increase in fluid pressure in the relay piston chamber and in the self-lapping piston chamber 37. The relay valve will, therefore, operate to effect a further supply of fluid under pressure to the brake cylinder 1.

The stem 109 in its upward movement engages first the pilot valve stem 129 and then the hollow supply valve stem 120. Engagement of the piston stem 109 with the pilot valve stem 129 raises the pilot valve 127 from its seat in the valve stem 120 to open communication from the pilot valve chamber 122 to the relay slide valve chamber 112. Fluid under pressure will pass from the pilot chamber 122 into the slide valve chamber 112, past the pilot valve 127 at a much more rapid rate than it can be supplied from the supply valve chamber 123 to the pilot valve chamber through the restricted port 124, thus rapidly decreasing the pressure within the pilot valve chamber. Consequently when the piston stem 109 engages the hollow stem 120 of the supply valve 117, the fluid pressure on the upper side of the supply valve is substantially reduced and the supply valve is then subject mainly to the force of the spring 121, urging it against its ring seat 131. The supply valve 117 is, therefore, raised from its seat more quickly because of the prior venting of the chamber 122, permitting the supply of fluid under pressure from the volume reservoir 126 to the brake cylinder 1 through pipe and passage 125, supply valve chamber 123, past the supply valve 117 to the slide valve chamber 112 and through passage and pipe 113.

Movement of the supply valve 117 from its seat to effect the supply of fluid under pressure to the slide valve chamber 112 and to the brake cylinder 1, also effects the supply of fluid under pressure through the restricted port 134 to the chamber 133, causing the pressure within the chamber 133 to build up to the pressure within the slide valve chamber 112, but at a slightly slower rate. When the pressure within the chamber 133 becomes substantially equal to that within the piston chamber 97, thus equalizing the pressure on the upper and lower sides of the application piston 108, the supply valve spring 121 will force the supply valve 117 and the piston stem 109 downwardly, causing the supply valve to seat and cut off communication from the volume reservoir 126 to the brake cylinder 1, excepting for the small amount of flow that takes place through the restricted port 124 and past the pilot valve 127. Should the stem 109 not immediately move sufficiently to permit the pilot valve 127 to seat, the gradual supply of fluid under pressure from the supply valve chamber 123, through the restricted passage 124, the pilot valve chamber 122, past the unseated pilot valve 127 to the slide valve chamber 112, and through the restricted port 134, to the chamber 133, will cause the pressure on the upper side of the application piston 108 to build up sufficiently to move the application piston and the stem 109 sufficiently to effect disengagement between the end of the piston stem 109 and the end of the pilot valve stem 126, thus permitting the pilot valve to be forced to its seat by the pressure of the spring 128. Should the pressure within the slide valve chamber 112 and the brake cylinder 1 become greater than that within the relay piston chamber 97, either as the result of an increase in pressure within the slide valve chamber 112, or a decrease in pressure within the piston chamber 97, the application piston 108 and the stem 109 will move downwardly sufficiently to cause the slide valve 111 to slightly open the ports 114 and 115, permitting the flow of fluid under pressure from the brake cylinder 1 and the slide valve chamber 112 to the atmosphere through the exhaust passage 116 until the pressures on opposite sides of the application piston 108 again become equal. It will, therefore, be noted that the operation of the application piston 108 and the stem 109 is such as to maintain fluid under pressure within the brake cylinder 1, and the slide valve chamber 112, at a pressure substantially corresponding to the pressure within the relay piston chamber 97.

In a similar manner movement of the brake valve handle 12 from a position within its electric application zone, to or toward its release position, effects a corresponding movement of the cam 13 and a lowering of the fulcrum point formed by engagement of the cam with the rounded end 14 of the floating lever 15. This causes the lever 15 to pivot about the pin 34 to move its right end, together with the contact carrying lever 19, upwardly to effect separation of the contact members 22 and 29 and deenergization of the winding of the release magnet valve device, and movement of the release magnet valve 89 to its upper or fluid releasing position to effect the release of fluid under pressure from the self-lapping piston chamber 37 and the relay piston chamber 97, and an operation of the relay valve device to effect a corresponding release of fluid under pressure from the brake cylinder 1.

If the vehicle is moving in such direction as to carry the retardation control device 6 toward the left, as viewed in Fig. 1, and if, while the brakes are applied, the rate of retardation of the vehicle becomes sufficient to cause the pendulum 49 to swing toward the left and actuate the spring pressed plunger 64 against the stop member 68, the switch contact member 51 will be forced out of engagement with the switch contact member 52, interrupting the circuit to the magnet 101 of the application magnet valve device 87, and preventing further operation of the application valve 102 to a brake applying position. In this position of the retardation controller pendulum, the application and release magnet valves 102 and 89, respectively, will be maintained in their lap positions. If the rate of retardation of the vehicle becomes sufficient to cause the pendulum 49 to swing further toward the left, so as to move the spring pressed plunger 64 and the stop 68, carrying the sleeve 69, against the pressure of the spring 73, the switch member 54 will be forced out of engagement with the switch member 55, thus interrupting the circuit through the conductor 63 and the winding of the release magnet valve device 86, and effecting operation of the release magnet valve 89 to its fluid releasing position. This effects a release of fluid under pressure from the brake cylinder 1, in the manner above described, until the rate of retardation of the vehicle has become sufficient to cause the pendulum 49 to swing toward the right a sufficient amount to permit the switch contact member 54 to again engage the contact member 55 and complete the circuit through the conductor 63 and the winding of the release magnet valve device 86, to again effect movement of the valve 89 to its lap position.

If the brakes are applied while the vehicle is traveling in a direction to carry the retardation controller 6 toward the right, as viewed in Fig. 1, the inertia of the pendulum 49 will cause it to swing against the pressure of the spring pressed plunger 65, and, if the rate of retardation becomes sufficient, to cause operation of the spring pressed switch contact members 57 and 61, in the same manner as the spring pressed contact members 51 and 54 were actuated upon movement of the pendulum 49 toward the left, to interrupt the circuit through the conductors 59 and 63, respectively.

Should the electric circuits to the application magnet valve device 87, and the release magnet valve 86, fail for any reason, the operator may effect a pneumatic application of the brakes by movement of the brake valve handle 12 beyond its electric application zone to its pneumatic service application, or to its emergency application position, as defined by the notched plate 10 shown in Fig. 4. As will be apparent by reference to Figs. 3 and 4, the rotary valve 41 is in a release zone and the triple valves which control the pneumatic application of the brakes, are in their release positions for any position of the brake valve lever 12 within the electric application zone, and the pneumatic lap position, pneumatic service application position, and pneumatic emergency application position of the lever 12 and rotary valve 41 are beyond the electric application zone.

If the operator desires to effect a pneumatic service application of the brakes, he moves the brake valve handle 12 to its pneumatic service application position, in which position fluid under pressure is vented from the brake pipe 7 to the exhaust port 46, through cavity 47 in the rotary valve 41. The reduction in brake pipe pressure thus produced, causes the piston 143 and the piston stem 144 to be moved upwardly, first moving the graduating valve 146 to lap the port 155 in the slide valve 145, and to effect communication, through a port 183, between the slide valve chamber 107 and a passage 184, within the slide valve 145, which passage terminates in upper and lower ports 185 and 186, respectively, in the valve seat, and then moving the slide valve 145. As the piston stem 144 continues its upward movement, a finger 187 at its lower end engages the lower shoulder of the slide valve 145, moving the slide valve to its service application position to lap the end of the passages 154, 94, and 92 in the valve seat, and to effect registration of the valve ports 185 and 186, respectively, with the passages 160 and 148, effecting communication from the auxiliary reservoir 106, and the slide valve chamber 107, to the brake cylinder volume reservoir 147 and to the relay valve piston chamber 97, the latter communication being effected through the passage 160, the inshot cut-off valve chamber 162, and the passage 96 to effect an operation of the relay valve device to apply the brakes in accordance with the pressure within the relay piston chamber 97, as explained above when describing the electric application of the brakes. When the pressure within the relay valve piston chamber builds up to the value at which the inshot cut-off valve operates, the piston 165 will be forced downwardly, permitting the ball valve 163 to seat and prevent further flow of fluid under pressure to the relay valve piston chamber.

If the operator moves the brake valve handle 12 to its pneumatic emergency application position, fluid under pressure will be vented from the triple valve piston chamber 141, and the brake pipe 7, at a more rapid rate, causing the piston 143 and the slide valve 145 to be moved upwardly until the port 188 registers with the end of the passage 160 in the valve seat to effect communication from the slide valve chamber 107 to the relay piston chamber 97 through the inshot cut-off valve chamber 162 in the same manner as when a pneumatic service application of the brakes is made, and to move the lower end of the slide valve 145 upwardly sufficiently to unlap the end of the passage 148 leading to the brake cylinder volume reservoir 147, to effect communication from the auxiliary reservoir 106 and the slide valve chamber 107 to the brake cylinder volume reservoir 147.

As explained, the inshot cut-off valve device 161 is effective, upon either pneumatic service application of the brakes or pneumatic emergency application of the brakes, to limit the degree of braking pressure effected through operation of the triple valve. This is desirable upon pneumatic application of the brakes after failure of the electric circuits, because the retardation controller is not then effective to reduce the degree of braking pressure in case of too great a rate of deceleration of the vehicle, as is the case when the brakes are applied electrically. A greater initial degree of application of the brakes is, therefore, permitted when an electric application is made. Upon movement of the brake valve handle 12 to pneumatic service or emergency position when the electric control mechanism is functioning properly, the triple valve effects a rapid supply of fluid under pressure to the relay valve device until a pressure is reached sufficient to cause the inshot valve to close. At the same time fluid under pressure is being supplied to the relay valve device past the electrically operated application valve 102.

The safety valve device 169 is effective to limit the pressure within the relay valve piston chamber 97 when the release magnet valve device 86 is deenergized and the release valve 89 is unseated, thus effecting communication from the piston chamber 97 to the atmosphere through the passage 96, restricted port 95, chamber 90, valve chamber 91, passage 92 and safety valve device 169. The safety valve 169 retains fluid under pressure within the relay piston chamber when the pressure has been reduced to some predetermined value.

Should the operator move the brake valve handle 12 to its pneumatic service application position or to its pneumatic emergency application position while the electric circuits are operative, thus making a combined electric and pneumatic application of the brakes, and should the electric self-lapping brake valve device operate to interrupt the circuit through the winding of the release magnet valve device 86 and permit the release valve 89 to be moved from its seat while the triple valve is in either its service or its emergency position, in which position communication from the release valve chamber 91 to the atmosphere through the exhaust passage 94 is closed, fluid under pressure will be released from the relay valve piston chamber 97 through the release valve chamber 91 and the safety valve device 169, until the pressure has been reduced to that pressure at which the safety valve closes. A predetermined pressure will, therefore, be retained within the relay valve piston chamber until the triple valve is moved to its release position.

While I have illustrated and described one preferred embodiment of my invention, it will be apparent to those skilled in the art that many modifications thereof may be made within the spirit of my invention, and I do not wish to be limited otherwise than by the scope of the appended claims.

Having now described my invention, what I claim as new and desire to secure by Letters Patent, is:

1. In a fluid pressure brake for vehicles, the combination with a brake cylinder, of valve means operative to open communication through which fluid under pressure is supplied to the brake cylinder, and valve means operative to open communication through which fluid under pressure is released from the brake cylinder, electrically operable means for controlling said valve means to effect the application and release of the brakes, manual means for controlling the operation of said electrically operable means, pressure responsive means for controlling the operation of said electrically operable means in accordance with the degree of application of the brakes, and inertia controlled means having contact members connected in circuit between said manually operable means and said electrically operable means for interrupting the energization of said electrically operable means.

2. In an electropneumatic brake, the combination with a brake cylinder, of electrically controlled means for effecting the supply of fluid under pressure to the brake cylinder, a self-lapping mechanism, including a chamber, for controlling the electric circuit of said electrically controlled means and operative upon an increase in fluid pressure in said chamber for causing said electrically controlled means to cut off the supply of fluid under pressure to the brake cylinder, and an inertia controlled means for interrupting the circuit to said electrically controlled means upon a predetermined rate of retardation of the vehicle.

3. In a fluid pressure brake, the combination with a brake cylinder, of electrically controlled means for effecting the supply of fluid under pressure to the brake cylinder and to a chamber manually operable contact making means therefor having a self-lapping mechanism, including said chamber, operative upon an increase in fluid pressure in said chamber for effecting the cutting off of the supply of fluid under pressure to the brake cylinder, an inertia controlled contact making means for effecting the deenergization of said electrically controlled means independently of the operation of said manually operable control means to limit the rate of retardation of the vehicle.

4. In a fluid pressure brake, the combination with a brake cylinder, of electrically controlled means for effecting the supply of fluid under pressure to the brake cylinder and to a chamber, manually operable control means therefor having a self-lapping mechanism, including said chamber, operative to close an electric circuit for effecting the supply of fluid under pressure to the brake cylinder and to said chamber, and operative upon an increase in fluid pressure in said chamber for effecting the cutting off of the supply of fluid under pressure to the brake cylinder, and an inertia controlled means having a switch in circuit between said manually operable control means and said electrically controlled means operative for interrupting the control circuit therebetween upon a predetermined rate of retardation of the vehicle.

5. In an electropneumatic brake, the combination with a brake cylinder, of electrically controlled means operative when energized for effecting the supply of fluid under pressure to the brake cylinder, a self-lapping mechanism, including a chamber, for controlling the electric circuit of said electrically controlled means and operative upon an increase in fluid pressure in said chamber for causing said electrically controlled means to cut off the supply of fluid under pressure to the brake cylinder, and an inertia controlled means having a switch in circuit with said electrically controlled means operative for interrupting the control circuit upon a predetermined rate of retardation of the vehicle.

6. In an electropneumatic brake, the combination with a brake cylinder, of electrically controlled means comprising magnet valve devices operative when energized for effecting the supply of fluid under pressure to the brake cylinder and operative when deenergized for effecting the release of fluid under pressure from the brake cylinder, a self-lapping mechanism, including a chamber, for controlling the electric circuit of said magnet valve devices and operative upon an increase in fluid pressure in said chamber for causing an operation of said magnet valve devices to cut off the supply of fluid under pressure to the brake cylinder, and an inertia controlled device for interrupting the circuit to said magnet valve devices upon a predetermined rate of retardation of the vehicle.

7. In an electrically controlled brake for vehicles, in combination, electrically operable means effective when energized for applying the brakes and when deenergized for releasing the brakes, manually operable means for controlling said electrically operable means, pressure responsive means for controlling the operation of said electrically operable means in accordance with the degree of application of the brakes and inertia responsive means effective upon a predetermined rate of deceleration of the vehicle for interrupting the circuit to said electrically operable means independently of the operation of said manually operable means.

8. In an electrically controlled brake for vehicles, in combination, electrically operable means for controlling the application and release of the brakes, manually operable means including electric contact members for controlling said electrically operable means, pressure responsive means subject to brake cylinder pressure for also operating said contact members to control the operation of said electrically operable means in accordance with the degree of application of the brakes, and an inertia responsive device having switch contact members through which the circuits controlled by said first named contact members are completed for controlling said electrically operable means in accordance with the rate of deceleration of the vehicle.

9. In an electrically controlled brake for vehicles, in combination, electrically operable means for controlling application and release of the brakes, manually operable means for controlling said electrically operable means, pressure responsive means for controlling the operation of said electrically operable means in accordance with the degree of application of the brakes, and an inertia controlled device operable to interrupt a circuit between said manually operable means and said electrically operable means upon a predetermined rate of retardation of the vehicle.

10. In a brake equipment for vehicles, the combination with a brake cylinder, of a control valve device having a magnet valve section, a triple valve section, and a relay valve section, said relay valve section controlling the supply of fluid under pressure to, and the release of fluid under pressure from, said brake cylinder, said magnet valve section and said triple valve section being effective to control the operation of said relay valve section, manually operable means having switch contact members for controlling said magnet valve section and valve means for controlling triple valve section in accordance with a desired degree of braking, and an inertia responsive device having switch contact members for also controlling said magnet valve section in accordance with the rate of retardation of the vehicle.

11. In a brake equipment for vehicles, the combination with a brake cylinder, of a control valve device having a magnet valve section, a triple valve section, an inshot valve section, and a relay valve section, said relay valve section being effective to control the supply of fluid under pressure and the release of fluid under pressure from said brake cylinder, said magnet valve section, inshot valve section, and triple valve section being effective to control the operation of said relay valve section, manually operable means for controlling said magnet valve section and said triple valve section in accordance with a desired degree of braking, and speed controlled means for also controlling said magnet valve section.

12. In a brake equipment for vehicles, braking means, electroresponsive control means for controlling the application and release of the brakes, pneumatic control means for controlling the application and release of the brakes, a retardation controller for governing said electroresponsive control means to limit the degree of application of the brakes in response to the rate of deceleration of the vehicle, and valve means for limiting the degree of application of the brakes to a predetermined amount when applied in response to the operation of the said pneumatic control means only.

13. In a brake equipment for vehicles, braking means, electroresponsive control means and pneumatic control means for controlling the application and release of said braking means, valve means for limiting the degree of application of the brakes upon operation of said pneumatic control means to a brake applying position to a lesser amount than that permitted upon operation of said electroresponsive control means to a brake applying position, and retardation controlled means for decreasing the degree of application of the brakes when applied through operation of said electroresponsive control means.

14. In a brake equipment for vehicles, a brake cylinder, electrical means and pneumatic means for controlling the supply of fluid under pressure to said brake cylinder, manually operable means for effecting the operation of said control means, valve means for limiting the brake cylinder pressure to a predetermined amount upon operation of said pneumatic means to a brake applying position, and a retardation controller for limiting the brake cylinder pressure upon operation of said electrical means to a brake applying position.

15. In a brake equipment for vehicles, a brake cylinder, a relay valve for controlling the supply of fluid under pressure to and the release of fluid under pressure from said brake cylinder, magnet valve means for controlling the supply of fluid under pressure to and the release of fluid under pressure from said relay valve, a triple valve for controlling the supply of fluid under pressure to and from said relay valve, manually operable means for controlling said triple valve and said magnet valve means, an inshot valve for limiting the supply of fluid under pressure supplied through operation of said triple valve to a brake applying position to a value less than permitted upon operation of said magnet valve means to a brake applying position, and retardation controlled means for governing said magnet valve means for limiting the degree of application of the brakes in response to the rate of retardation of the vehicle.

16. In a brake equipment for vehicles, a brake cylinder, magnet valve means for controlling the supply of fluid under pressure to said brake cylinder, a triple valve for controlling the supply of fluid under pressure to said brake cylinder, manually operable means for controlling the operation of said magnet valve means and of said triple valve, an inshot valve between said triple valve and said brake cylinder for limiting the supply of fluid under pressure to said brake cylinder upon operation of said triple valve to a brake applying position and retardation controlled means for governing said magnet valve means to limit the degree of application of the brakes in response to the rate of retardation of the vehicle.

17. In a brake equipment for vehicles, a brake cylinder, magnet valve means for controlling the supply of fluid under pressure to said brake cylinder, a triple valve for controlling the supply of fluid under pressure to said brake cylinder, manually operable means for controlling the operation of said magnet valve means and of said triple valve, an inshot valve between said triple valve and said brake cylinder for limiting the supply of fluid under pressure to said brake cylinder upon operation of said triple valve to a brake applying position, retardation controlled means for governing said magnet valve means to limit the degree of application of the brakes in response to the rate of retardation of the vehicle, and means permitting a partial release only of fluid under pressure from said brake cylinder upon operation of said magnet valve means to its release position while said triple valve is in other than its release position.

18. In a brake equipment for vehicles, a brake cylinder, magnet valve means for controlling the supply of fluid under pressure to said brake cylinder, a triple valve for controlling the supply of fluid under pressure to said brake cylinder, manually operable means for controlling the operation of said magnet valve means and of said triple valve, and valve means for limiting the supply of fluid under pressure to said brake cylinder upon operation of said triple valve to a brake applying position, and means permitting a partial release only of fluid under pressure from said brake cylinder upon operation of said magnet valve means to its release position while said triple valve is in other than its release position.

19. In a brake equipment for vehicles, a brake cylinder, magnet valve means for controlling the supply of fluid under pressure to said brake cylinder, a triple valve for controlling the supply of fluid under pressure to said brake cylinder, manually operable means for controlling the operation of said magnet valve means and of said triple valve, and means permitting a partial release only of fluid under pressure from said brake cylinder upon operation of said magnet valve means to its release position while said triple valve is in other than its release position.

20. In an electropneumatic brake, in combination, a brake cylinder, electrically controlled valve means for controlling the supply of fluid under pressure to the brake cylinder, means for controlling said valve means comprising manually operable means having contact members for controlling the circuit of said electrically controlled means, means on said manually operable means for also operating said contact members to control said circuit according to the degree of fluid pressure supplied to the brake cylinder, and inertia controlled means having contact members in series circuit relation with said above named contact members for also controlling said circuit.

21. In a brake equipment for vehicles, magnet valve means for controlling the supply of fluid under pressure for effecting application and release of the brakes, fluid pressure responsive valve means normally subject to fluid under pressure and operative to an application position upon a reduction in fluid pressure to supply fluid under pressure for effecting application of the brakes, means for controlling said magnet valve means, means for effecting a reduction in fluid pressure to cause said fluid pressure responsive valve means to move to application position, and means rendered effective to limit the reduction in brake applying pressure effected by said magnet valve means to a certain minimum pressure only when said pressure responsive valve means is in application position.

ELLIS E. HEWITT.